July 25, 1961 N. BLAKE 2,993,816
CONDUCTING TEXTRYLS
Filed March 30, 1960

INVENTOR
NORMAN BLAKE
BY *Francis H. Deef*
ATTORNEY

United States Patent Office 2,993,816
Patented July 25, 1961

2,993,816
CONDUCTING TEXTRYLS
Norman Blake, Rochester, N.Y., assignor to E. I. du Pont de Nemours and Company, Wilmington, Del., a corporation of Delaware
Filed Mar. 30, 1960, Ser. No. 18,765
15 Claims. (Cl. 117—226)

This invention is related to the preparation of porous, paper-like sheets containig particulate material. It is particularly related to the preparation of porous, electrically-conducting paper-like sheets. More specifically, it is related to the production of such sheets composed wholly of a synthetic polymer.

Attempts in the past to produce conducting sheets by incorporating conducting particles into films and non-woven structures have produced rather discouraging results. The incorporation of conducting materials into films has produced either surface coatings with poor permanence, or required extremely high loadings to obtain a reasonable degree of conductivity through the structure. Furthermore, these products did not have the porosity required for many applications.

Attempts have been made to prepare porous conducting structures by other routes, but these likewise have been disappointing. For example, attempts to impregnate non-woven structures, such as air-laid batts, with powdered particles have led to non-uniform structures with high resistivities. More uniform impregnation can be achieved by dipping these batts into solutions or dispersions of the conducting material. However, these batts tend to disintegrate unless extreme care is taken. Obviously, this has not proved to be a feasible route to the products of this invention. Furthermore such batts would be too porous for the applications of interest.

Another possible route to the products of this invention would be to impregnate papers. Cellulosic papers have not proved to be acceptable because they do not take up the conducting material in a suitable manner. Previous attempts to make papers from synthetic fibers have not resulted in the formation of structures which could take up the conducting material in a sufficiently uniform manner to produce a sheet with low resistivity, nor could they be pressed to form permanently conducting sheets, particularly at low loadings of conducting material.

Accordingly, it is an object of this invention to provide a process for producing a porous sheet containing a macroscopically uniform distribution of particulate material. It is a particular object of this invention to provide a process for producing a porous, conducting sheet containing a macroscopically uniform distribution of an electrically conducting solid. It is also an object of this invention to provide a porous-conducting sheet comprising synthetic polymers and powdered conducting material.

The term "macroscopically uniform distribution" is intended to describe structures which comprise a network of particulate material distributed uniformly through a web of polymeric material which is substantially free of particulate material in the interior. The particulate material is inorganic (carbon, silver, copper, etc.) and lies on the surface of the synthetic polymeric material (usually fibrids, or mixture of fibrids and fibers) making up the web. Relatively little of this inorganic material penetrates into the polymer fibrids or fibers on pressing, which means that it remains substantially entirely on the surface of the fibrids and fibrous material, although it is permanently held by or in the pressed sheet.

According to this invention, a non-woven paper-like web structure comprising synthetic organic polymeric material and from about 5% to about 100% by weight of the structure of a synthetic polymer binder is impregnated with finely divided particles of an inorganic solid, particularly an electrically conducting solid, the particles being no larger than about 5 microns in diameter, and the impregnated structure pressed under conditions such that the synthetic binder decreases in surface area by at least 75%. Suitable products are provided when the impregnated structure is pressed at between 5 and 800 p.s.i. and at between 90 to 300° C.

The preferred starting material for this process is a paper-like web, which will be referred to as a textryl, composed of from about 5% to about 100% by weight of synthetic polymeric binder material capable of shrinking at least about 75% in surface area upon heating to within about 5° C. below the polymer melt temperature, the remaining proportion being fibrous material. Preferably, the binder is present in an amount of from about 20% to about 35% by weight of the article. More particularly, it is preferred that the binder material consist of fibrids. Fibrids are the synthetic polymer analogs of cellulose pulp and are described and defined in copending application Serial No. 635,876. The preferred structures are those in which the fibrous materials are made from synthetic polymers.

The invention will be more readily understood by reference to the drawings.

Figure 1:
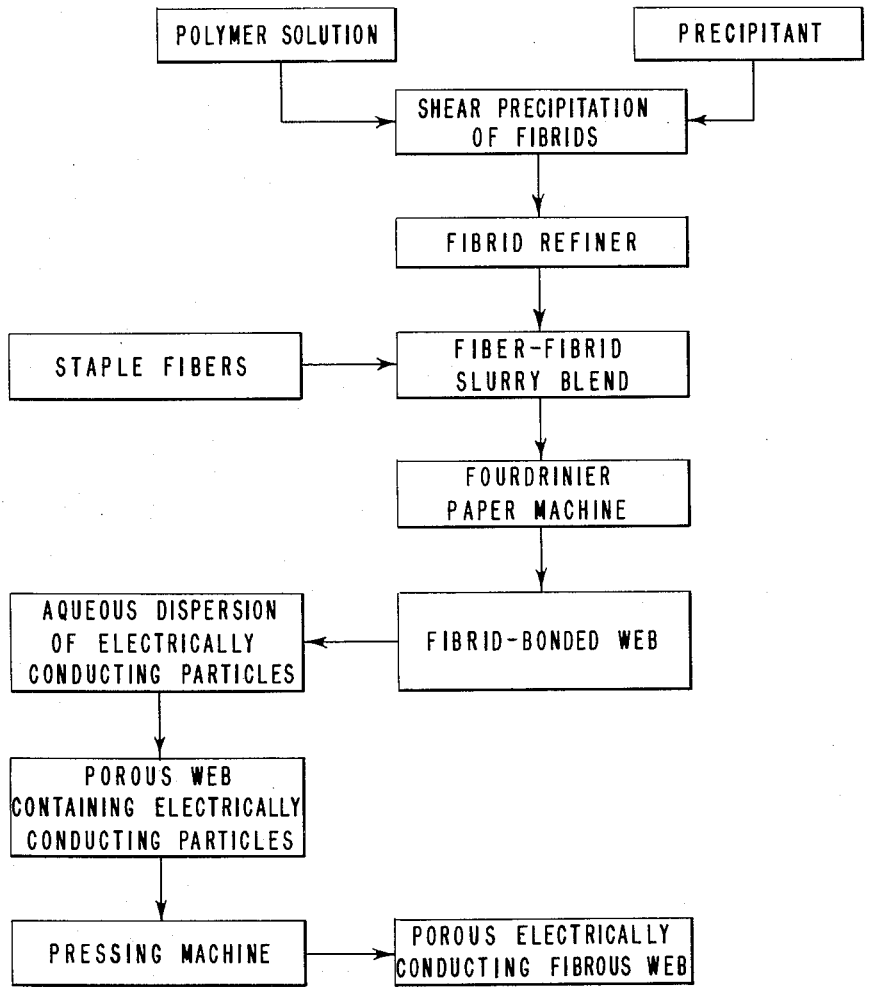
FIGURE 1 is a flow sheet of the preparation of the fibrous web of the present invention when fibrids are employed as the binder material and a pressing step is used.
Figure 2:
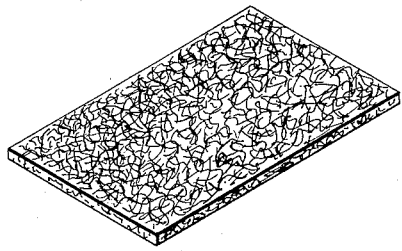
FIGURE 2 is a schematic illustration of the porous electrically conducting fibrous web of the present invention. In this illustration, the fibrous nature of the web has been over emphasized since the space shown between the fibers is partially taken up by the binder material and conducting particles and in many instances the web has a smooth surface much like that of conventional papers.

The porous electrically conducting structures of this invention comprise at least about .1% by weight of the web of the finely divided conducting particles and have Sheffield porosities between about 2.0 and about 68 cu. ft./min./sq. in./10 p.s.i. and volume electrical resistivities between about $1 \times 10^{-5}$ and about $1 \times 10^8$ ohm-cm. The preferred products of this invention are strong sheets having Sheffield porosities between about 3.0 and about 50 cu. ft./min./sq. in./10 p.s.i. and volume resistivities below about 50 ohm-cm. These sheets will usually have tenacities above 1 lb./in./oz./yd.² and the preferred products have tenacities about 2.5 lbs./in./oz./yd.². The tenacities are much higher at low loadings and may approach 10 lbs./in./oz./yd.². If strengths are calculated on the basis of polymer content alone, there is substantially no loss in strength on adding the conducting material.

Sheffield porosity is measured on a Sheffield Porosimeter, manufactured by the Sheffield Corporation of Dayton, Ohio. The air flow in cu. ft./sq. in. of surface per minute under 10 p.s.i. is measured.

The following examples illustrate this invention.

EXAMPLE I

This example illustrates the formation of a textryl which is suitable as a starting material for preparing the products of this invention.

A flake formed from a polymer containing 20% poly(hexamethylene adipamide) and 80% polycaproamide is cut to pass through a ⅜" screen. A 15% solution with a viscosity of 150 centipoises is prepared by adding 50 pounds of this polymer to a mixture of 255 pounds of ethylene glycol and 28.3 pounds of water in a 50 gallon tank and stirring at 115° C. for 3½ hours. A precipitant for the polymer is prepared by mixing 108 gallons of ethylene glycol with 100 gallons of water and cooling to −16° C. This precipitant is fed into a tank with a 15 gallon holdup at the rate of 3.54 gals./min. After 8-10 gallons have been added to the tank, the polymer solution at a temperature of approximately 110° C. is added at a rate of 4.24 lbs./min. while addition of the precipitant is continued at the same rate. The stirrer in the tank is operating at 4100 revolutions per minute.

A slurry of the fibrids produced is removed from the bottom of the tank to maintain a constant volume. Blending is continued until 235 pounds of polymer solution have been used. A total of 237 gallons of slurry containing 1.7% solids is obtained. This slurry is filtered on a rotary drum filter and washed with water until substantially free of solvent. The final filter cake contains 17-18% solids.

The washed fibrids are added to water to form a 0.062% consistency slurry, which is passed through a disc mill once at a 0.003" setting. The refined fibrids are combined with 1/4" 3-denier type 6-6 nylon filaments to produce a blend containing 70% fiber and 30% fibrid. The final slurry, which has a consistency of 0.08%, is added to the head box of a Fourdrinier paper machine operating at 16 ft./min. The sheet produced has a basis weight of 1.3 ozs./yds.$^2$. This type of sheet will be referred to as a textryl.

EXAMPLE II

A 5" x 5" sheet of a textryl prepared as described in Example I is dipped into 500 ml. of an aqueous colloidal graphite dispersion containing 1% of graphite particles having diameters within the range of 0.005 to about 0.5 micron (e.g., a commercially available graphite dispersion sold under the name "Aquadag" by the Acheson Colloids Company in Port Huron, Michigan). The sheet is removed from the dispersion and permitted to dry at room temperature. It is then pressed for 0.5 minute at 175° C. and 600 p.s.i. This sheet has a tensile strength of 11.0 lbs./in./oz./yds.$^2$, the same as that of a control sheet containing no graphite after pressing in the same manner. However, the resistivity has been decreased from approximately $10^{14}$ ohm-cm. for the control sheet to 480 ohm-cm.

The following tabulation shows how the properties vary as the amount of graphite in the bath and, consequently, the amount of graphite in the sheet, is increased. It will be noted that the resistivity decreases rapidly to very low values at relatively low graphite loadings. Another important fact to be noted is that this conductivity is not lost when these samples are boiled in water. This is indeed surprising in view of the porosity of the sheets.

Table I

| Percent Graphite In Dip Bath | Percent Graphite In Textryl | Resistivity in ohm-cm. | | |
|---|---|---|---|---|
| | | Before Boiling | After 30 mins. In Boiling Water | After 1 hr. In Boiling Water |
| 3 | 8.6 | 30 | 60 | 65 |
| 10 | 69.0 | 1.1 | 1.5 | 1.8 |

A similar sheet containing 20.7% graphite has a Sheffield porosity of 15 cu. ft./min./sq. in./p.s.i. A two foot square heating pad constructed from this sheet dissipated 20 watts from a 110 volt line, and operated quite satisfactorily.

EXAMPLE III

The following example illustrates the formation of another textryl which is suitable for use in this invention.

A 74/26 percentage composition ethylene terephthalate/ethylene isophthalate copolymer (10 pounds) is added to N,N-dimethylformamide to produce a 10% solution. This solution is injected at a temperature of 90° C. through a 1/4 inch inside diameter nozzle at a rate of approximately 100 cc./min. close to the impeller of a stirrer operating at approximately 8000 revolutions per minute and placed near the bottom of a two-gallon baffled tank containing about one gallon of water. The fibrids produced are filtered and washed with water until free of solvent and precipitant.

These fibrids are blended with 1/4 inch, 3 denier poly(ethylene terephthalate) filaments to give a 70/30 percentage composition fiber/fibrid slurry with a 0.05% consistency. A sheet is prepared from this on a Fourdrinier paper machine as described in Example I.

EXAMPLE IV

A 12" x 12" sheet prepared as described in the preceding example is dipped into aqueous colloidal graphite dispersions of varying compositions, the graphite particles having diameters within the range of 0.005 to about 0.5 micron and pressed for thirty seconds at 185° C. and 600 p.s.i. The following table of data records the results of these experiments and compares the properties of the impregnated sheets with a control sheet containing no graphite.

Table II

| Percent Graphite In Dip Bath | Percent Graphite In Sheet | Resistivity In Ohm-Centimeters | Tenacity After Pressing |
|---|---|---|---|
| 0 | 0 | Infinity | 13.2 |
| 2 | 1-2 | 2,000 | 10.8 |
| 10 | 34 | 1.8 | 6.5 |

EXAMPLE V

A 2" x 10" sheet prepared as described in Example I is dipped in a dispersion containing 43% by weight of silver particles, none of which have a particle size above 5 microns, the remainder being a mixture of butyl phthalate and butyl acetate. The sheet is dried in an air oven at 100° C. and pressed for 30 seconds at 175° C. and 600 p.s.i. The pressed strip is 0.0107 inch thick and contains 71% by weight of silver. A strip of the pressed sheet 1/2 inch wide and 10 inches long has a volume resistivity of $6 \times 10^{-4}$ ohm-cm. The resistivity is unchanged after a portion of the sheet has been boiled for one hour in water containing a small quantity of sodium lauryl sulfate.

EXAMPLE VI

Another 2" x 10" sample of the sheet of the preceding example is dipped in a dispersion containing 43% by weight of finely-divided copper particles, none of which has a particle size above 5 microns, the remainder being a mixture of butyl phthalate and butyl acetate. The sheet which contains about 75% by weight of copper, is dried and pressed as before. The pressed sheet has a volume resistivity of $2.2 \times 10^{-4}$ ohm-cm. This can be used quite readily as a conductor by soldering copper wires to it. Again the resistivity remains unchanged after boiling in water for one hour. A comparable product prepared from another sample of the same starting sheet in the same manner has a Sheffield porosity of 4.5 cu. ft./min./sq. in./10 p.s.i.

EXAMPLE VII

A polyamide with an inherent viscosity of 1.3 in sulfuric acid is prepared from metaphenylenediamine and isophthalic acid. It is dissolved in a mixture of 98 parts of N,N-dimethylacetamide and 2 parts of pyrrolidine to form a 10% solution, and 50 grams of the solution so formed is poured into a 300 milliliter quantity of highgravity glycerol in a one quart Waring Blendor operating at full speed. A mass of frazzled fibrids about 1/8 of an inch long and about 5 microns in diameter is formed. After collecting, washing, drying and fluffing, these fibrids are found to have a surface area of 49.2 square meters per grams, and a water absorption of 7.9 grams of water per gram of fibrid. A portion of water dispersed, washed fibrids is formed into a waterleaf on a 100 mesh screen. The unpressed, dried 15 mil sheet has a tenacity of 0.044 g.p.d., a bursting strength of 20 lbs./in.$^2$, a basis weight of 116.2 grams per square meter, and an elongation of 5.8%.

A 2" x 10" pressed strip of this textryl, prepared as described in earlier examples is dipped in a dispersion containing 43% by weight of silver particles, none of which have a particle size above 5 microns, the remainder being a mixture of butyl phthalate and butyl acetate. The sheet is dried in an air oven at 100° C. and is pressed for 30 seconds at 175° C. and 600 p.s.i. The pressed strip is found to contain in excess of 50% by weight of silver. A strip of the pressed sheet ½ inch wide and 10 inches long has a volume resistivity of approximately $5 \times 10^{-4}$ ohm-cm. The resistivity is unchanged even after prolonged treatment with boiling water.

Because of their high temperature stability, fibrids prepared from this wholly aromatic polyamide provide a conducting textryl sheet which is uniquely stable under nearly all conditions. In addition, such sheets are substantially insensitive to exposure to high energy radiation and suffer no loss of physical or electrical properties thereby.

In addition to textryl sheets prepared wholly from fibrids, it is equally useful to employ, in the practice of the present invention, sheets which contain both fibrids and staple fibers of wholly aromatic polyamides. Such sheets exhibit porosity and electrical properties equivalent to the sheets described in the preceding example.

EXAMPLE VIII

A quantity of the fibrids of the preceding example is formed into two waterleaves in an 8" x 8" handsheet mold. The resulting waterleaves have a basis weight of 1.45 oz./yd.$^2$. The waterleaves are dried in air and then there is applied to them separately a dispersion of silver particles in an organic solvent. The silver particles have a particle size below 5 microns. The sheets are coated with the silver dispersion by application to one side only of the handsheet, the dispersion penetrating partially but not completely through the waterleaf. Following the application of the silver particles, the two handsheets are placed with the coated sides together and hand pressed, following which the two-layered structure is dried at 70° C. for 10 minutes, and then pressed in a Carver press at 200° C. This converts the waterleaf to a paper-like material. The resulting laminate is resistant to delamination and is found to be highly conductive.

When a similar sandwich is prepared employing 4" x 4" sheets, with an electrode formed by strips of platinum foil placed at two opposite corners of the sheet, there results a conducting textryl with a distance of 3½ inches between electrodes. The resistance between these electrodes is between one and two ohms. When the electrodes are attached to a 1½ volt battery it is found that a current of 7 amperes flows across the sheet and the sheet becomes warm to the touch.

EXAMPLE IX

In another experiment, employing the same fibrids as the preceding example, a tape is made 1¼ inches wide and 30 inches long. The waterleaf tape is coated as before and two such coated tapes are pressed together with a copper foil electrode at each end. There is obtained in this way a double-thickness conducting tape, 30 inches long. The tape is wrapped around a test tube containing water. A 6 volt storage battery is connected to the electrodes, and a current of 9.5 amperes is discharged through the tape. With stirring, this current is sufficient to heat the water from an initial temperature of 24.5° C. to 90° C.

The products of this invention are prepared from non-woven or paper-like sheets containing a synthetic polymer binder material which is capable of undergoing a 75% decrease in volume on pressing at some suitable temperature. Satisfactory results, including the 75% decrease in volume of the binder material, are attained on pressing at between 5 and 800 p.s.i. and at between 90 and 300° C.

The decreased resistivity of the products of this invention is satisfactorily achieved when the solid impregnants have particle sizes below about 5 microns. They may be incorporated into the sheet by any suitable method. The preferred method is to dip the sheet into a dispersion of the particulate material in a non-solvent liquid.

Appreciable reduction in resistivity is realized in the conducting and semi-conducting products of this invention at very low loadings of conducting material. The resistivity is substantially reduced by the incorporation of as little as about 1% of the conducting material. Resistivity continues to drop rapidly with increased loading of conducting material, but this decrease begins to level off at conducting particle loadings of approximately 20% by weight. When using colloidal graphite, resistivity is reduced to the 1–2 ohm-cm. range at loadings of approximately 30% by weight. For exceptionally low resistivities even higher loadings, up to about 80% by weight, if desired, may be used. As shown in Examples V and VI, resistivities in the range of true conductors are obtained by the use of high loadings of metallic conductors. The strength of these sheets containing low percentages of stress-bearing component is approximately the same as that of sheets which contain no such component.

Conducting particles suitable for use in this invention include conducting carbons such as acetylene black and graphite, and finely-divided metals, such as silver and copper. Many preparations suitable for use in this invention are commercially available. For example, colloidal aqueous graphite dispersions are commercially available, as are silver dispersions used in the preparation of printed circuits and in other applications. Other particulate materials which may be incorporated in the products of this invention for aesthetic and economic reasons include dyes, pigments, such as titanium dioxide, fillers, etc.

While suitable binder materials have been illustrated in the examples by use of fibrids, other suitable polymers for the preparation of the binders, e.g., the fibrids, and/or the fibrous materials used to prepare the textryls utilized as the starting materials in this invention include the following: acrylonitrile polymers and copolymers containing at least 85% by weight of combined acrylonitrile such as acrylonitrile/methyl acrylate; polyacrylic and polymethacrylic esters, such as poly(methyl methacrylate); vinyl chloride polymers and copolymers such as vinyl chloride/vinyl acetate; vinylidene chloride polymers and copolymers, such as vinylidene chloride/vinyl chloride; vinyl fluoride polymers and copolymers such as vinyl fluoride/hexafluoropropylene; polyhydrocarbons, such as polyethylene; chlorosulfonated polyethylene; polychlorotrifluoroethylene; poly(vinyl alcohol); partially hydrolyzed poly(vinyl esters); polyamides, such as type 6–6 nylon; polyurethanes, such as the reaction product of piperazine and the bischloroformate of ethylene glycol; polyureas; polyesters, such as poly(ethylene terephthalate), polytheolesters; polysulfonamides; polysulfones; polyoxymethylene; plasticized vinyl polymers; and elastomers, including natural and synthetic rubbers, the latter including both the addition and condensation type of elastomers.

Copolymers of all types, including those specified above, may be used. Derivatives of the polymers, such as the halogenated polyhydrocarbons, are also suitable. The fibrous materials which are blended with the binders may be cellulosic, including both rayon and beaten cellulose.

One advantage of using sheets containing binders which are capable of shrinking at least 75% in surface area upon heating to within 5° C. below the polymer melt temperature is that they are more rapidly processable. The necessary shrinking is effected also under pressure conditions at suitable temperatures. Such sheets may be handled without any special precautions; impregnation is simple and may be carried out at commercial speeds.

The products have many advantages over the prior art. One important advantage is their porosity, which is needed for many applications such as shown below. Another important advantage is the low resistivity which can be obtained at relatively low loadings of conducting material. Furthermore, contrary to previous experience in attempting to load non-woven webs and paper-like structures, the pressed impregnated sheets are wash-fast to boiling water. This demonstrates the mechanical stability of these compositions and the permanence of the high conductivity. Another advantage is the ability to incorporate pigmenting material to produce penetration through the entire sheet. Multicolor printing of these sheets is readily achieved.

The novel products of this invention have many useful applications. One is the use of these conducting sheets as the heating element in electrically heated blankets and pads. The excellent flexibility and durability of these sheets recommend their use in such applications. An outstanding characteristic of such articles is the uniform manner in which the heat is distributed. These sheets are also suitable as interlinings for various garments, or as the garments themselves. A suitable energy source, such as a battery, may be provided for these garments if desired.

Large panels of the sheeting can be fabricated into walls, ceilings, and/or floors in houses, to provide heating in areas where electricity is cheap. Canopies for electrostatic shielding of electronic equipment, as well as the shielding on "shielded" cables are other applications. A similar application is as the "lossy" jacket for microwave transmission lines. Also, the conductivity of these sheets suggests their use in operating rooms, where the freedom from static electricity would greatly reduce the hazards of explosion.

Because of the high temperature stability of the wholly aromatic polyamides employed in some preferred embodiments of the present invention, conducting sheets of this kind are useful as disposable heater elements for ovens, to provide a large surface area which is hot and which gives a uniform, readily controlled heated area. In particular such sheets are useful for warming ovens, drying ovens and cooking ovens. Temperatures as high as 250° C. can be readily achieved and can be maintained for long periods of time without causing any degradation of the polymeric material.

In addition, such sheets are ideally suited for panel heatings for rooms or smaller areas, as heating elements in laboratory and plant heaters, for pipes, lines and specialized apparatus, as hot pads, heated clothing and other equipment where a large area of uniform heat with complete freedom from hot spots is desirable.

In place of the conducting silver shown in connection with the wholly aromatic polyamide materials, it is possible to use graphite, copper dispersions and other conducting particles as shown.

A particularly valuable and important application of the present invention is the use of these conducting sheets as elements of printed circuits. Because of their wide range of conductivity and because of their extremely high strength and flexibility these materials can readily be assembled into printed circuits using strips of any desired and specificable resistivity per inch. The conducting elements can readily and rapidly be fused onto a base sheet of the same polymeric material but of higher stiffness, if desired. In addition, such elements can be applied to a shaped or a curved base to permit greater utilization of space in electronic components for applications where size and space are premium considerations.

Many other equivalent modifications will be apparent to those skilled in the art without a departure from the inventive concept.

This application is a continuation-in-part of United States application Serial No. 701,290, filed December 9, 1957, now abandoned.

What is claimed is:

1. A porous electrically conducting article comprising a fibrous web comprising from about 5% to about 100% by weight of synthetic polymeric binder material capable of shrinking at least about 75% in surface area upon heating about 5° below the polymer melt temperature, the remaining proportion being a fibrous material, said fibrous web containing at least about 0.1% by weight of the web of a macroscopically uniform distribution of electrically conducting particles having a particle diameter of no greater than about 5 microns, said article being characterized by a Sheffield porosity of between about 2.0 and about 68 cubic feet/minute/square inch/10 pounds per square inch and a volume resistivity of between about $1 \times 10^{-5}$ and about $1 \times 10^8$ ohm-cm.

2. The article of claim 1 wherein the synthetic polymeric binder material is present in an amount of from about 20% to about 35% by weight of the article.

3. The article of claim 1 wherein the Sheffield porosity is between about 3.0 and about 50 cubic feet/minute/square inch/10 pounds per square inch.

4. The article of claim 1 wherein the volume resistivity is below about 50 ohm-cm.

5. The article of claim 1 wherein the synthetic polymeric binder material comprises fibrids.

6. The article of claim 5 wherein the fibrids consist essentially of poly(metaphenylene isophthalamide).

7. The article of claim 5 wherein the fibrous material comprises a synthetic polymer.

8. The article of claim 7 wherein the polymer is poly(metaphenylene isophthalamide).

9. The article of claim 1 wherein the fibrous material comprises a synthetic polymer.

10. The process comprising incorporating electrically conducting particles having a diameter of no greater than about 5 microns into a fibrous article comprising from about 5% to about 100% by weight of a synthetic polymeric binder material capable of shrinking in surface area at least about 75% upon heating to within about 5° below the polymeric melt temperature, the remaining proportion being a fibrous material, to produce an article containing at least about 0.1% by weight of the particles macroscopically uniformly distributed throughout the article.

11. The process comprising incorporating electrically conducting particles having a diameter of no greater than about 5 microns into a fibrous web comprising from about 5% to about 100% by weight of a synthetic polymeric binder material capable of shrinking in surface area at least about 75% upon heating to within about 5° below the polymer melt temperature, the remaining proportion being a fibrous material, to produce a web containing at least about 0.1% by weight of the particles macroscopically uniformly distributed throughout the web, and treating the web to decrease the surface area of the binder material by at least about 75%.

12. The process of claim 11 wherein the treatment to decrease the surface area of the binder material at least about 75% comprises subjecting the web to pressures between 5 and 800 p.s.i. and temperatures between 90 and 300° C.

13. The process comprising dipping into a dispersion containing electrically conducting particles having a diameter no greater than about 5 microns a fibrous web comprising from about 5% to about 100% by weight of a synthetic polymeric binder material capable of shrinking in surface area at least about 75% upon heating to within about 5° below the polymer melt temperature, the remaining proportion being fibrous material, whereby at least about 0.1% by weight of the article of particles is macroscopically uniformly distributed throughout the web.

14. The process comprising dipping into a dispersion containing electrically conducting particles having a diameter no greater than about 5 microns a fibrous web comprising from about 5% to about 100% by weight of a synthetic polymeric binder material capable of shrinking in surface area at least about 75% upon heating to within about 5° below the polymer melt temperature, the remaining proportions being fibrous material, whereby at least about 0.1% by weight of the article of particles is macroscopically uniformly distributed throughout the web, drying said web, and treating the web to decrease the surface area of the binder material by at least about 75%.

15. The process of claim 14 wherein the treatment to decrease the surface area of the binder material at least about 75% comprises subjecting the web to pressures between 5 and 800 p.s.i. and temperatures between 90 and 300° C.

References Cited in the file of this patent

UNITED STATES PATENTS

| | | |
|---|---|---|
| 2,314,766 | Bull et al. | Mar. 23, 1943 |
| 2,721,153 | Hopf et al. | Oct. 18, 1955 |
| 2,808,352 | Coleman et al. | Oct. 1, 1957 |
| 2,849,339 | Jaffe | Aug. 26, 1958 |

FOREIGN PATENTS

| | | |
|---|---|---|
| 902,111 | Germany | Jan. 18, 1954 |